Aug. 2, 1960 H. MARCEL 2,947,432
CAP SEALS AND THE LIKE FOR THE SEALING AND FOR THE
PUTTING OF A CAPSULE ON CONTAINERS
PARTICULARLY ON BOTTLES

Filed April 15, 1957 2 Sheets-Sheet 1

INVENTOR
HENRI MARCEL
BY Irwin S. Thompson
ATTY.

United States Patent Office

2,947,432
Patented Aug. 2, 1960

2,947,432

CAP SEALS AND THE LIKE FOR THE SEALING AND FOR THE PUTTING OF A CAPSULE ON CONTAINERS PARTICULARLY ON BOTTLES

Henri Marcel, 44 Quai Jayr, Lyons (Rhone), France

Filed Apr. 15, 1957, Ser. No. 652,888

Claims priority, application France May 4, 1956

5 Claims. (Cl. 215—41)

The present invention relates to cap seals and the like used ordinarily for the sealing of bottles and the like and it concerns more particularly the cap seals intended to cover the necks of bottles previously sealed by means of any suitable means.

The cap seals of the present invention are placed as a capsule over the neck and mouth of a bottle and are generally constructed either by metallized papers suitably glued on the neck of the bottle or by sheathing of thermoplastic material or the like. In the case of thermoplastic material, in order to render inviolable the said capsule thus constructed, one had to heat said sheathing of plastic material so that said sheathing may take the exact shape of the contour of the neck of the considered bottle and that said sheathing may adapt itself on either side of the flange generally present in the vicinity of the upper end of the bottle. This subjection is very awkward in practice and slows down considerably the operation of placing a capsule on the bottle when it has to be made in a standardized production on a large number of bottles previously sealed. Besides the heating of said capsules necessitates, for their simultaneous adaptation on the considered bottles, machines and apparatus which are very expensive and complicated.

The present invention aims more particularly toward the manufacture of capsules which are to be put on a bottle, allowing thus a quick and easy adaptation on the bottles without necessitating either any special tool or any prior heating. Besides the capsule to be placed on a bottle according to the invention is absolutely inviolable and thus warrants the authenticity of the contents of the considered bottle. Finally the manufacturing of said capsule by molding of a suitable plastic material allows the advantageous combination of said cap seals with the different methods and known devices for effective sealing.

The cap seal according to the invention is manufactured by molding of a plastic material such as for instance polyethylene, polyvinyl chloride or some polyamides so that this material can be stretched elastically out of shape, and said cap seal is pricipally noteworthy in that its body is of a general cylindrical shape and comprises for the housing of the flange of the bottle's neck or the like an annular recess, the lower wall of which forms a stop abutting against the corresponding horizontal shoulder of the flange and prevents thus any removal of said cap seal after it has been set in place, the diameter of the different parts of said body being such that said body adapts itself perfectly on the bottle's neck by allowing however the driving in of said cap seal by deformation of the constitutent plastic material of said cap seal.

In order to facilitate the driving of said cap seal on the bottle's neck or the like, the skirt of the body (that is to say the part located below the annular recess for the flange) constitutes a decreasing thickness from the top to the bottom, the lower edge of said skirt being of a trifling thickness so that it may easily stretch out of shape during the driving and then may contract itself when in place in order to fit narrowly the shape of the bottle's neck.

According to another form of construction of the invention the skirt of the cap seal comprises inner vertical projecting parts which have the shape of wedges and which contain between them passages for the escape of the air enclosed inside the cap seals by the setting in place thereof on the neck. One understands moreover that said vertical projecting parts may extend themselves over the whole length of said skirt or may be made in a fragmentary manner by constituting thus horizontal rows of suitable reliefs. The upper end of said projecting parts which corresponds to the greater thickness of the wedge-shaped profile constitutes the discontinuous lower wall of the annular recess and fits under the lower shoulder of the flange of the bottle's neck.

The cap seal to be utilized as a capsule on a bottle's neck according to the invention may be combined with different sealing means of the bottle iself, its easy setting in place on the bottle's neck and its adherence on the flange of said neck thereby obtaining a perfect seal. Furthermore it goes without saying that manufacturing the capsule in a molded plastic material facilitates considerably the following combinations: the assembly constituted by the cap seal to be utilized as a capsule on a bottle's neck, and the sealing means manufactured in only one suitable molding operation.

The attached drawing given by way of example sets forth a better understanding of the invention of the characteristics presented by said invention and the advantages which said invention is able to provide.

Figure 1:
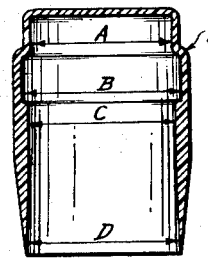
Fig. 1 is a vertical section of a cap seal to be put on a bottle's neck according to the invention.

The cap seal intended to be placed as a capsule on a bottle's neck and illustrated in Fig. 1 is formed by molding a supple plastic material for instance colored or uncolored polyethylene according to the decorative aims which should be reached. In the same way the skirt of the cap seal may comprise any desired motive or any desired publicity.

Figure 3:
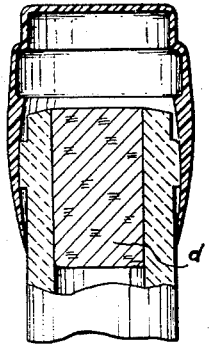
Fig. 3 shows a vertical section of the cap seal and of the bottle's neck during the initial stages of applying said cap seal on said bottle's neck.
Figure 2:
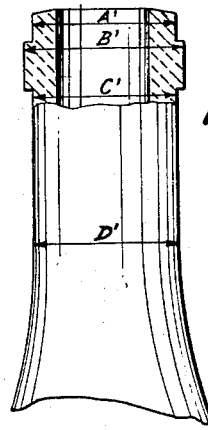
Figure 2 is a partial vertical section of the neck of a bottle on which said cap seal is to be mounted.

Said cap seal presents the shape of a hollow cylindrical body sealed at its upper extremity and open at its lower extremity. Immediately below the upper bottom, the body of the cap seal comprises a cylindrical part having an inner diameter A equal (or preferably very slightly less) to the external diameter A' of the upper extremity of the bottle's neck of Fig. 2. Below said upper cylindrical part, the body of the cap seal comprises a marked shoulder defining a lower skirt the outside of which is nearly cylindrical but the thickness of the wall of which varies according to each place. Starting from the top one meets first an inner annular recess of a diameter B equal (or preferably slightly less) to the outside diameter B' of the flange of the bottle's neck. Below said recess the inner of said skirt comprises a truncated part, the small diameter C of which is equal (or preferably slightly less) to the corresponding outside diameter C' of the part of the bottle's neck located immediately below the flange, while its diameter D is equal (or preferably slightly less) to the corresponding outside diameter D' of the bottle's neck. One understands thus that the material's thickness of the skirt is increasing from the bottom, starting from the diameter D and ending at the diameter C, the thickness at the level of the diameter C being maximum and defining a real step intended to fit under the lower horizontal shoulder of the flange of the neck. Said step avoids any voluntary or untimed withdrawal of the cap seal which when once adapted on the neck may never be removed without tearing. Thus, warranty of the authenticity of the contents of the bottle is assured. The setting in place of the cap seal, according to the invention, is however easy and quick owing to the deformability of the plastic material constituting the body of the cap seal. As one may see in Fig. 3, the lower skirt is easily stretched out of shape in order to allow passage for the flange of the neck which, once placed in the annular recess, is tightly locked within said capsule. If the inner diameters of the different parts of the capsule are made slightly smaller than the outside diameter of the corresponding parts of the neck, the cap seal is held perfectly in place without needing any previous heating. It may be thus driven in place simply with the hand or with the help of any appropriate instrument or tool. The placing in place of the plastic cap seals of the present invention necessitates no setting or the like as is the case with the cap seals of metallized paper or of a sheet of metal.

Figure 5:
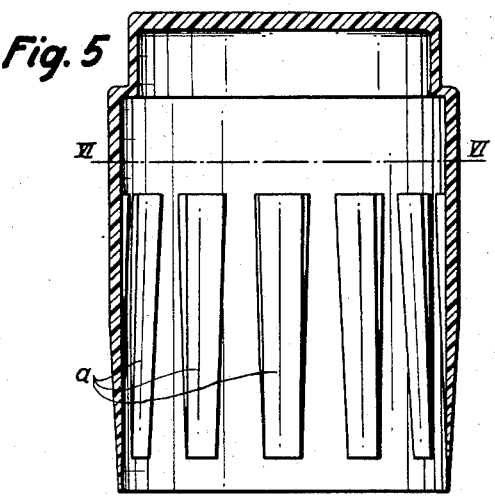
Fig. 5 is a vertical section at a greater scale of a cap seal manufactured according to an embodiment of the invention.
Figure 6:
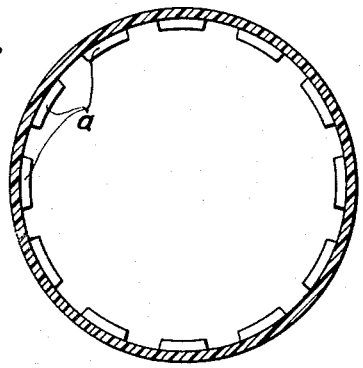
Fig. 6 is a horizontal section along line VI—VI (Fig. 5).
Figure 7:
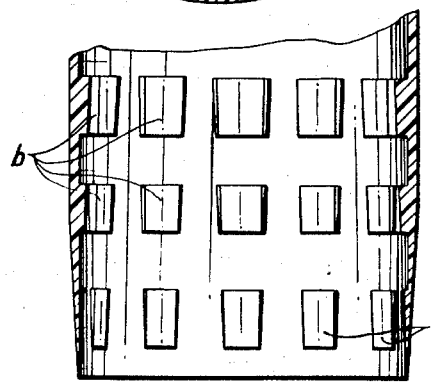
Fig. 7 shows a partial vertical section of the wall of a cap seal according to another embodiment of the invention.

In the modified form of construction represented on Figs. 5 and 6, the step of the cap seal's skirt is not made continuously along the inner periphery of said skirt but it is constituted by the upper extremity of vertical projecting parts a of a decreasing thickness from the top to the bottom. One understands that this form of manufacture procures identical advantages to those of the cap seal of Fig. 1 as well as decreasing substantially the weight of the body of said cap seal and also in leaving free spaces between the projecting parts for the escape of the air enclosed in the cap seal when it is driven in place. As shown on Fig. 7, the vertical projecting parts may be also cut out horizontally so as to form peripheral rows of varying thickness of reliefs.

Figure 8:
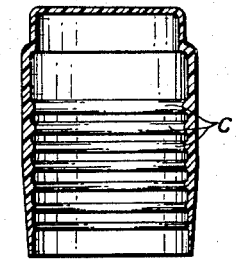
Fig. 8 shows a section of a further embodiment of manufacture of the cap seal according to the invention.

In Fig. 8 is shown the application of the invention to a known type of cap seal for the sealing of a bottle or for the placing as a capsule on a bottle's neck. In said form of construction, below the recess for the flange of the neck, the cylindrical skirt comprises a series of circular horizontal flanges c intended to bear against the neck in order to form a labyrinth joint.

Figure 4:
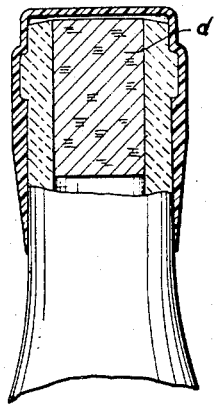
Fig. 4 shows the neck of the bottle covered with the cap seal according to the invention.
Figure 9:
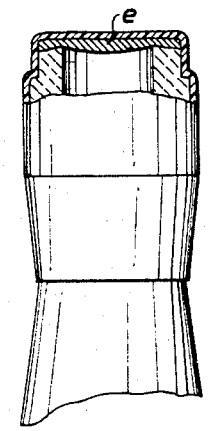
Figs. 9, 10 and 11 represent some examples of manufacture of cap seals to be placed as a capsule over the bottle's neck according to the invention combined with sealing obturator devices.

In the preceding examples, one has supposed that the bottle which is to be covered over was previously corked with the help of a cork bush d (Figs. 3 and 4) or the like. The cap seal was simply intended to cover the bottle's neck in altogether decorative and sealing aims. But it is possible, owing to the perfect adaptation of the cap seal on the bottle's neck, to ensure the sealing of the bottle in inserting a cork washer such as in e (Fig. 9) between the upper face of the opening of the bottle and the inner wall of the bottom of the cap seal which is to be used as a capsule on the bottle's neck. This washer e is tightly held in place and opposes any leaking of the liquid. Setting the washer in place may be easily, effected as it is sufficient to place it on the bottom of the cap seal when said cap seal is driven in place.

Figure 11:
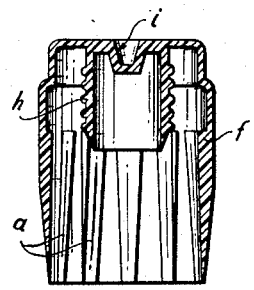
Figure 10:
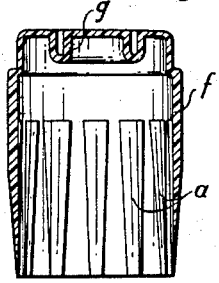

The manufacturing of the cap seal by the moulding of a plastic material allows for the combination of different known sealing means. In Fig. 10, a cap seal for placing over the bottle's neck is represented by f, and the horizontal upper bottom of which comprises a vertical cylindrical projecting part represented by g is intended to be engaged in the inner part of the bottle's neck, that is, the circular edge of the neck is placed between said projecting part g and the inner wall of the cap seal f. The sealing and placing of the cap seal on the bottle's neck may be then manufactured in a single operation and with the help of a single cap seal which is easily manufactured by molding. The variation of Fig. 11 shows a similar manufacture in which the upper bottom of the cap seal f comprises, on the one hand, a circular projecting part h having annular ribs and, on the other hand, a hollow i for the opening of a bottle or flask with the help of a corkscrew or the like.

Whatever the adopted method of manufacture may be, one obtains a cap seal of simple and inexpensive manufacture, perfectly inviolable without tearing, and not necessitating for its setting in place any instrument or operation.

Figure 12:
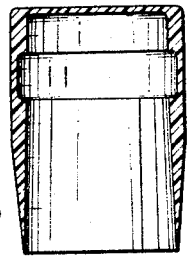
Fig. 12 shows a variation of the cap seal of Fig. 1.

Besides, it is to be understood that the above description has been given as an example and that it does not at all limit the scope of the invention, whereby one could not obtain from it by replacing the described details the construction of any other equivalent. It is to be especially understood that the cap seal may present itself from the outside under the form of a cylindrical body such as that shown schematically on Fig. 12. In this variation, the outside cylindrical wall, comprised between the upper horizontal bottom and the lower extremity of the skirt, is rectilinear and does not comprise the unhooking j of Fig. 1, for the housing of the neck flange. This setting may eventually simplify the molding of the cap seal in avoiding the necessity to obviate a corresponding projecting part in the mold.

I claim:

1. In a plastic cap seal for the sealing of containers having a neck and an annular flange on said neck, said plastic cap seal comprising an upper part having a recess for the annular flange of the neck of the container, a skirt, an annular shoulder in the inner surface of the skirt defining the lower margin of said recess for the annular flange of the neck, the thickness of said skirt decreasing progressively from said shoulder to its lower extremity, and means on the inner surface of said skirt enabling the air enclosed in said cap seal to escape when driven in, said skirt ending in a flexible and elastically deformable circular edge the diameter of which is slightly less than the diameter of said neck to effect a snug fit, the elasticity of said skirt causing the engagement of said shoulder under said flange of said container neck to prevent any removal of said cap seal when once set in place.

2. A cap seal as claimed in claim 1 in which said means comprises inner vertical projecting parts having the shape of wedges, passages spaced between said projecting parts whereby the air enclosed inside said cap seal escapes through said passages during the setting in place of said cap seal on the container's neck.

3. A cap seal as claimed in claim 3 and in which said wedge shaped projecting parts are interrupted and are disposed in horizontal rows.

4. A cap seal as claimed in claim 3 and comprising a cork washer located inside said cap seal, whereby when said cap seal is in place on said container's neck said cork washer is tightened against the upper extremity of said container's neck and constitutes thus a sealing means.

5. A cap seal as claimed in claim 3 and in which the upper portion of the cap seal has a cylindrical vertical projecting part coaxial to said cap seal, whereby when said cap seal is driven in over a container's neck, said vertical projecting part engages inside said container's neck in order to tightly seal said container.

References Cited in the file of this patent

UNITED STATES PATENTS

| | | |
|---|---|---|
| 1,720,835 | Holmdahl | July 16, 1929 |
| 1,882,995 | Scofield | Oct. 18, 1932 |
| 2,536,655 | Nebesar | Jan. 2, 1951 |
| 2,551,834 | Ferguson | May 8, 1951 |
| 2,778,179 | Miliez | Jan. 22, 1957 |

FOREIGN PATENTS

| | | |
|---|---|---|
| 770,451 | Great Britain | Mar. 20, 1957 |
| 868,594 | France | Oct. 13, 1941 |
| 955,745 | France | July 4, 1949 |